(12) United States Patent
Muttik et al.

(10) Patent No.: US 8,769,692 B1
(45) Date of Patent: Jul. 1, 2014

(54) SYSTEM AND METHOD FOR DETECTING MALWARE BY TRANSFORMING OBJECTS AND ANALYZING DIFFERENT VIEWS OF OBJECTS

(75) Inventors: Igor G. Muttik, Berkhamsted (GB); Anthony Vaughan Bartram, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 190 days.

(21) Appl. No.: 13/182,641

(22) Filed: Jul. 14, 2011

(51) Int. Cl.
*G06F 12/14* (2006.01)
*G06F 11/00* (2006.01)
*G06F 12/16* (2006.01)

(52) U.S. Cl.
USPC .............................. 726/24; 726/22; 726/23

(58) Field of Classification Search
None
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,230,288 | B1 | 5/2001 | Kuo et al. |
| 6,460,050 | B1 | 10/2002 | Pace et al. |
| 7,506,155 | B1 | 3/2009 | Stewart et al. |
| 8,201,245 | B2 * | 6/2012 | Dewey et al. ................... 726/22 |
| 2010/0024033 | A1 * | 1/2010 | Kang et al. ..................... 726/23 |
| 2012/0174224 | A1 * | 7/2012 | Thomas et al. ................. 726/24 |
| 2012/0266244 | A1 * | 10/2012 | Green et al. .................... 726/24 |

OTHER PUBLICATIONS

Exploit-ObscuredHtml, website: http://vil.nai.com/vil/content/v_131453.htm, retrieved Jul. 11, 2011 (1 page).
McAfee SiteAdvisor Enterprise Plus 2.0 Product Guide, Copyright 2008 McAfee, Inc. (48 pages).
McAfee Total Protection User Guide, Copyright 2008 McAfee, Inc. (274 pages).
McAfee—Virus Profile & Definition Exploit-ObscuredHtml—McAfee, Inc., website: http://home.mcafee.com/VirusInfo/VirusProfile.aspx?key=131453, retrieved Jul. 11, 2011 (2 pages).
Muttik, Igor G., "Manipulating the Internet", Virus Bulletin Conference, Oct. 2005 (8 pages).
Declaration of Igor G. Muttik, Oct. 7, 2013, 2 pages.

* cited by examiner

*Primary Examiner* — Shin-Hon Chen
(74) *Attorney, Agent, or Firm* — Patent Capital Group

(57) ABSTRACT

A method in one example implementation includes generating a plurality of transformed views of an object in a network environment and generating a plurality of filtered information sets. The method further includes detecting a suspect correlation based on an analysis of at least some of the plurality of transformed views and of at least some of the plurality of filtered information sets. In a more specific embodiment, the analysis includes an original view of the object. Other more specific embodiments include applying filters to selected views of the object, where each of the filters is associated with a different obfuscation type. Applying the filters includes transforming obfuscation elements in the plurality of transformed views, where the object contains the one or more obfuscation elements.

28 Claims, 3 Drawing Sheets

FIG. 3

SYSTEM AND METHOD FOR DETECTING MALWARE BY TRANSFORMING OBJECTS AND ANALYZING DIFFERENT VIEWS OF OBJECTS

TECHNICAL FIELD

This disclosure relates in general to the field of network security and, more particularly, to identifying new variants of malicious software by transforming objects and analyzing different views of objects.

BACKGROUND

The Internet has enabled interconnection of different computer networks all over the world. The ability to effectively protect and maintain stable computers and systems, however, presents a significant obstacle for component manufacturers, system designers, and network operators. This obstacle is made even more complicated due to the continually-evolving array of tactics exploited by malicious software authors. Malicious software authors create malicious software ('malware') to disrupt or stop computer operations, steal information, gain unauthorized access to system resources, and conduct other unauthorized abusive, hostile, intrusive, or annoying activities.

Malicious software authors often attempt to avoid detection by transforming or obfuscating malware, making it appear variable and, therefore, unrecognizable to security software such as anti-virus software. Undetected malware can infect computer systems and networks and often propagates to other computers and networks. For example, malware could send out spam or malicious emails from an infected network host, steal sensitive information from a business or individual associated with an infected network host, propagate to other computers, and/or assist with distributed denial of service attacks.

In one example obfuscation technique, web browsers (e.g., Internet Explorer, etc.) that automatically remove ASCII NUL bytes from HTML files can enable malware authors to hide malware from security software by scattering random NUL bytes through HTML files, such as a malicious scripts and web pages. This is referred to as the NUL HTML Exploit. In years past, McAfee, Inc. of Santa Clara, Calif., has provided security software targeting the NUL HTML Exploit in which a different view of an object is presented to a malware scanning engine. The different view shows a filtered HTML file with all ASCII NUL bytes removed. In addition, a map (or maps) shows where NUL bytes were removed and a count of the NUL bytes removed. By comparing the view and map, an irregular pattern of NULs could possibly be identified as malware. Additionally, the map could be evaluated to determine whether strings of interest identified in the filtered view had any NUL bytes filtered out. While this may be effective for a simple case of a NUL HTML Exploit, it is inadequate for accurately detecting more complicated forms of obfuscation in which multiple obfuscation types may be present. Security professionals need to develop innovative tools to combat such tactics that allow malicious software authors to exploit computers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes generating a plurality of transformed views of an object in a network environment and generating a plurality of filtered information sets. The method further includes detecting a suspect correlation based on an analysis of at least some of the plurality of transformed views and of at least some of the plurality of filtered information sets. In a more specific embodiment, the analysis includes an original view of the object. Other more specific embodiments include applying a plurality of filters to one or more selected views of the object, where each of the plurality of filters is associated with a different obfuscation type. Applying the filter includes transforming one or more obfuscation elements in the plurality of transformed views, where the object contains the one or more obfuscation elements. In yet further embodiments, each of the plurality of filtered information sets includes a location data and an obfuscation type representing one or more obfuscation elements.

Example Embodiments

Figure 1:
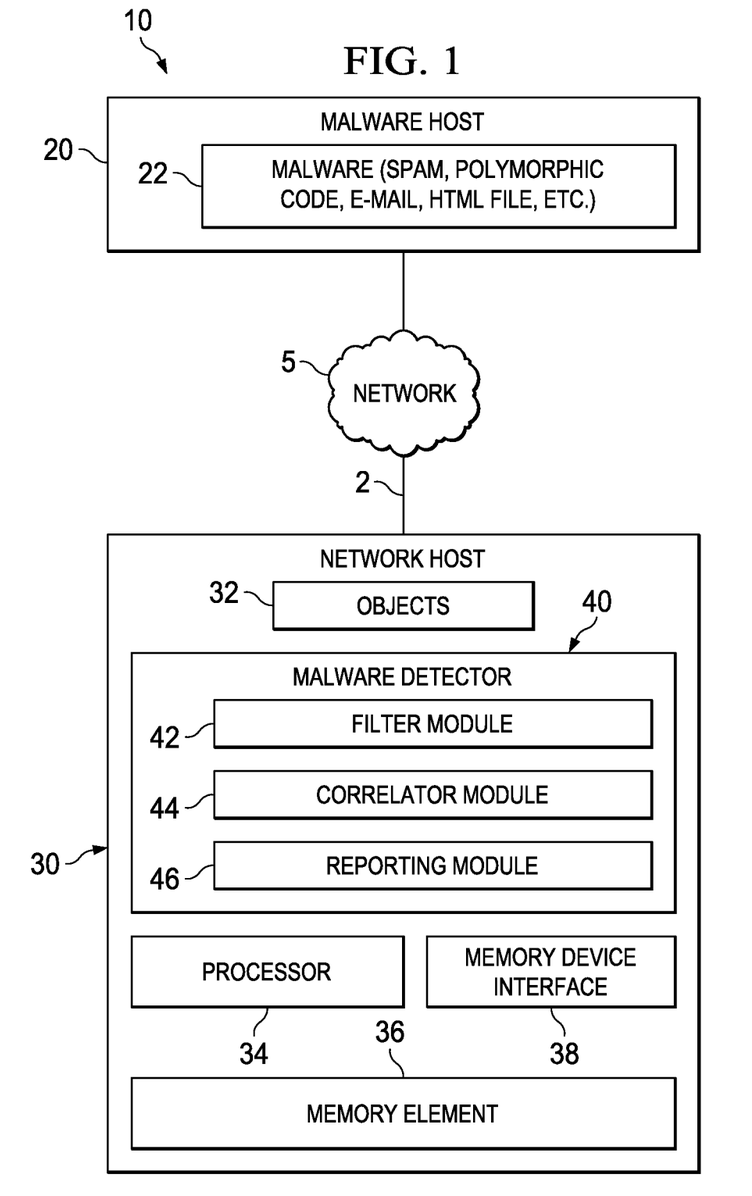
FIG. 1 is a simplified block diagram illustrating an example network environment in which objects may be transformed and analyzed to identify new variants of malicious software in accordance with the present disclosure.

FIG. 1 is a simplified block diagram illustrating an example embodiment of a network environment 10 in which an object is transformed and different views of the object can be analyzed to identify new variants of malicious software in accordance with the present disclosure. Network environment 10 can include a network 5 such as a Transmission Control Protocol/Internet Protocol (TCP/IP) network, which could include the Internet, connecting a malware host 20 and a network host 30. Malware host 20 may be controlled by a malware author who propagates malware 22 to network host 30 and other nodes in network environment 10. Malware host 20 could be an infected network element, end user computer, or other computer capable of propagating malware 22 to other nodes, such as network host 30. Generally, network host 30 represents network elements (e.g., servers, gateways, switches, routers, firewalls, etc.), embedded devices, and other computers (e.g., end user computers, mobile devices, etc.) capable of being compromised by malicious software ('malware') such as malware 22. Network host 30 includes a processor 34 and a memory element 36, and may have an associated Internet Protocol (IP) address. Network host 30 may also have a memory device interface 38 for receiving removable memory devices. In addition, network host 30 includes objects 32 and a malware detector 40 for transforming objects and analyzing different views of the objects to detect obfuscated objects, which could be malware. Malware detector 40 may include a filter module 42, a correlator module 44, and a reporting module 46.

In example embodiments, a system for transforming objects and analyzing different views of the objects can enable recognition of new variants of malware. In one example shown in FIG. 1, malware detector 40 on network host 30 can transform objects 32 into multiple different transformed views. As used herein, 'object' is intended to include any type of electronic file containing data or code, such as electronic mail (email) messages, email attachments, data files, executable files, binary programs, software, Hyper Text Markup Language (HTML) files or web pages, scripts, texts, domain names, signatures, flows, streams, packets, datagrams, memory/cache blocks, disk sectors/blocks/records, images, configuration data, etc. A transformed view of an object can be generated by applying a filter to an available selected view of the object (i.e., an original view or another transformed view of the object) in which certain elements of the object that appear in the selected view are transformed (e.g., removed, normalized, replaced, or otherwise suitably changed), resulting in a transformed view of the object. Each of the plurality of transformed views may be associated with a respective filtered information set, which contains information related to the transformed elements. Analysis of different views of the object and filtered information sets associated with any transformed views allows meaningful disambiguation and de-obfuscation of patterns that cannot be easily recognized by inspecting views of the same object in isolation. Suspect correlations may be detected based on an analysis of any suitable combination of the different views and filtered information together, where the different views are inclusive of one or more transformed views of the object and/or an original (untransformed) view of the object. Suspect correlations include items such as obfuscation, transformation, inconsistencies and/or discrepancies in a given object. Detected suspect correlations may indicate the object contains a malicious attribute (e.g., a virus, malware, polymorphic code, SPAM, DoS packet, etc.), and such information may be reported and any appropriate action may be taken.

For purposes of illustrating the techniques of the system for transforming objects and analyzing different views of the objects, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments of organizations and individuals often include a plurality of computers such as, for example, end user desktops, laptops, servers, network appliances, and the like, and each computer may have an installed set of executable software. In this Specification, references to "executable file" and "executable software" are meant to encompass any software file comprising instructions that can be understood and processed by a computer such as program files, binary files, code, library modules, object files, script files, interpreter files, other executable modules, and the like. Network environments of large organizations may include hundreds or thousands of computers with installed executable software, which may span different buildings, cities, and/or geographical areas around the world. Information Technology (IT) administrators may be tasked with the extraordinary responsibility of maintaining these computers in a way that minimizes or eliminates disruption to business activities.

IT administrators typically rely on security software to protect their network environments from malicious software. As used herein, the term malicious software (also referred to as 'malware') generally includes any object (typically a program file or configuration data) designed to access and/or control a computer without the informed consent of the computer owner and may include, for example, software, binary programs, executable files, data files, Hyper Text Markup Language (HTML) files, scripts, texts, domain names, or the like. Malware is most commonly used to reference any hostile, intrusive, or annoying objects such as a computer virus, spyware, adware, SPAM messages, social engineering messages, etc. Security software used in a network environment may be used to detect malware, report malware findings, and take appropriate remedial actions to ensure the safety and security of the network environment, which is inclusive of hardware, software, and confidential data. Accordingly, numerous types of security software solutions may be utilized to achieve such safety and security. In one example, anti-virus software may be deployed on network elements or other computers such as gateways, scanners, servers, end user computers, laptops, routers, network appliances, etc. Deployed anti-virus software may be regularly updated with new malware signatures as new malware is discovered.

One difficulty IT administrators and network security professionals face includes detecting new variants of known malware. Many anti-virus solutions perform searches for trivial, invariant strings of known malware. In order to avoid detection by such anti-virus solutions, malware authors (i.e., creators of malware) often employ transformation and obfuscation techniques to render each piece of malware unique.

Some security software attempts to detect obfuscated objects. For example, some anti-spam software collapses multiple spaces into one to treat all re-formatted emails in an equivalent manner. This technique, however, does not consider an amount and position of removed white spaces, which could provide valuable information enabling more accurate detections.

In one attempt to address the NUL HTML Exploit type of obfuscation, a heuristic detection of NULs within certain identifying strings has been used. Incorrect filtering of NULs, however, can corrupt the content presented for security software scanning, potentially causing false detection or performance problems. One typical false positive includes a file with a binary header followed by some amount of Unicode within the file. Unicode files usually have a significant amount of NUL bytes which may resemble an obfuscated HTML. Because the file is not a valid Unicode file, a false positive detection may be triggered. Thus, heuristics that eliminate valid Unicode files and then detect the presence of NULs within byte sequences are inadequate because Unicode fragments may be present within many proprietary binary file formats. The McAfee solution, previously described herein, of presenting a filtered view of an object (i.e., with NUL bytes filtered out) to a malware scanning engine reduces the number of false positives often detected when using a heuristic detection mechanism. This solution for the NUL HTML Exploit, however, is not effective for accurately detecting more complicated forms of obfuscation, such as obfuscation of polymorphic code and SPAM messages, in which multiple obfuscation types may be used to obfuscate an object.

Polymorphic code is used by some malware authors to obfuscate objects such as executable files, for example, machine code or assembly code. A polymorphic engine mutates and may add unnecessary or 'do-nothing' instructions to hide intended malicious functional aspects of the code. In addition, the code may be encrypted and a corresponding decryptor may be included in the code. The code may be collapsed into a shorter meaningful decryptor by removing these do-nothing instructions. However, multiple different types of do-nothing instructions may potentially be added to code, and different polymorphic engines may potentially add any combination of instructions to an object to make it appear variable and, therefore, non-malicious. For example, a polymorphic engine could add only no operation (NOP) instructions before a decryptor in the code and only application programming interfaces (APIs) after the decryptor. Another example is a polymorphic engine mutating the body of malware by using jump instructions (JMP or their functional equivalents).

Simply filtering out all known do-nothing instructions is often inadequate for making accurate identifications of malicious polymorphic code. Such filtering alone can potentially cause important information to be lost, such as a frequency of obfuscations, locations where the obfuscations are introduced, and distances from obfuscations to the intended malicious code or other meaningful code such as a decryptor. Without such information, false positives may be detected. For example, if all known do-nothing instructions are filtered out (or if jump instructions are removed resulting in the original order of instructions being restored after such transformation/filtering) without any other views of the code, then even knowing the locations and frequencies of the filtered instructions may not overcome the difficulty in determining whether a particular pattern or cluster of filtered instructions resulted from actual obfuscations of the code or from legitimate uses of the filtered instructions. In addition, it could also be difficult to determine properties of the polymorphic engine that is creating the obfuscations. Determining the properties of a polymorphic engine, however, can enable more accurate detections of polymorphic code produced from the polymorphic engine.

Another technique for obfuscating data involves text generators being used by malware (e.g., SPAM campaigns) to obfuscate objects such as SPAM messages in order to avoid detection by security software. Text generators may insert pseudo-random generated phrases and/or words in a message using a defined (and often limited) vocabulary. This is similar to the polymorphic code example in which simply filtering out all of the vocabulary words of a text generator from a particular object can potentially cause important information to be lost. Thus, the object could generate a false positive detection and actual properties of the text generator may not be perceptible. The ability to determine the properties of a text generator is desirable because if many SPAM campaigns use the same text generator, then perceiving the text generator's properties could facilitate security software enhancements to detect such messages, thereby significantly reducing the impact of the associated SPAM campaigns.

Network environment 10, as outlined in FIG. 1, can resolve many of these issues, and others. Embodiments in the present disclosure provide for transforming an object and analyzing different views of the object and information related to obfuscation elements in the object, thereby increasing the accuracy of identifying new variants of malware hidden by obfuscation techniques. In addition, particular malware properties may be identified and, accordingly, detection criteria can be refined. In accordance with one example implementation, multiple filters are applied to an object being processed on a network host with a malware detector (e.g., malware detector 40 on network host 30). Each filter applied to an available selected view of the object generates a transformed view of the object based on a particular obfuscation type. In addition, filtered information may also be generated that is associated with each transformed view. Filtered information can provide important information such as, for example, frequency of obfuscations, location of obfuscations, and obfuscation type. Thus, several transformed views of the same object and filtered information associated with each of the transformed views can be generated and analyzed, possibly along with an original view of the object, to detect malware. Analyzing multiple different views may involve finding features in one of the views, and then looking up correlated features within another view of the same object. Thus, analysis of the multiple different views of the same object enables meaningful disambiguation and de-obfuscation of patterns that cannot be easily recognized by inspecting views of the same object in isolation.

Note that in this Specification, references to various features (e.g., structures, modules, components, steps, etc.) included in 'one embodiment', 'example embodiment', 'an embodiment', 'another embodiment', 'some embodiments', 'various embodiments', 'one example', 'other embodiments', and the like are intended to mean that any such features may be included in one or more embodiments of the present disclosure. Additionally, any references herein to 'a plurality of' or 'multiple' items (e.g., views, filters, sets, elements, objects, etc.) is intended to include two or more of such items.

Turning to the infrastructure of FIG. 1, network environment 10 is one possible network configuration illustrating embodiments of a system in which objects can be transformed and different views of the objects can be analyzed to detect malware. Network environment 10 may be configured as one or more networks in any suitable form including, but not limited to, local area networks (LANs), wireless local area networks (WLANs), virtual local area networks (VLANs), metropolitan area networks (MANs), wide area networks (WANs) such as the Internet, virtual private networks (VPNs), Intranet, Extranet, any other appropriate architecture or system, or any suitable combination thereof that facilitates communications in a network.

In some embodiments, communication link 2 may represent any electronic links supporting connections from network host 30 to a malware author, such as malware host 20. Communication link 2 can be configured as any appropriate medium (e.g., digital subscriber lines (DSL), telephone lines, T1 lines, T3 lines, wireless, satellite, fiber optics, cable, Ethernet, etc. or any combination thereof) and/or through any networks such as the Internet. Routers, switches, and any other suitable network elements may be provisioned in network environment 10 to facilitate electronic communication between network host 30, network 5, and malware host 20. Note that network environment 10 may include a configuration capable of transmission control protocol/internet protocol (TCP/IP) communications for the transmission and/or reception of packets in the network. Network environment 10 could also operate in conjunction with a user datagram protocol/IP (UDP/IP) or any other suitable protocol (e.g., ones used for mobile communication such as GPRS, Edge, 3G, etc.), where appropriate and based on particular needs.

In one example scenario, malware may be received by network host 30 from connections to remote nodes such as malware host 20 via network 5 and communication link 2. Malware may also be propagated to network host 30 through local connections to infected computing devices, for example, within a LAN to which network host 30 is connected, and by infected memory devices (e.g., USB stick, compact disc (CD), digital versatile disc (DVD), etc.) which may connect to network host 30 through memory device interface 38, for example.

Network host 30 generally represents any computing device in a network environment such as network environment 10, which has the potential to be infected by malware. In one embodiment, network host 30 is a computing device connected to a TCP/IP network, including the Internet, and has its own IP address. Network host 30 could be a network element, which encompasses email gateways, web gateways, network appliances, servers, firewalls, routers, switches, bridges, load balancers, or any other suitable device or component operable to affect or process electronic information in a network environment. In other examples, network host 30 could be an end point device that serves as a terminal point for a network connection, in contrast to a gateway or firewall. Such end point devices are inclusive of end user devices (e.g., personal computers, laptops, desktops, etc.), mobile devices (e.g., smart phones, iPads, personal digital assistants (PDAs), etc.), networked TVs, embedded devices (e.g., smart home appliances, refrigerators, printers, GPS receivers, videogame consoles, traffic lights, factory or plant controllers, and any other devices or systems designed to perform one or a few dedicated functions), and any other similar electronic devices. It should be noted that the computing devices such as network host 30 and malware host 20, and the communication interconnections shown and described herein are for illustrative purposes only. FIG. 1 is intended as an example and should not be construed to imply architectural limitations in the present disclosure, as numerous other network configurations can also accommodate the embodiments disclosed herein.

Regarding an internal structure of network host 30, network host 30 may include memory element 36 for storing information to be used in the transforming and analyzing operations outlined herein. Additionally, network host 30 may include processor 34, which can execute software or an algorithm to perform the transforming and analyzing activities as discussed herein.

A processor such as processor 34 can execute any type of instructions associated with the data to achieve the operations detailed herein. In one example, processor 34 could transform an article (e.g., data) from one state or thing to another state or thing. In another example, the activities outlined herein may be implemented with fixed logic or programmable logic (e.g., software/computer instructions executed by a processor) and the processing components identified herein could be some type of a programmable processor, programmable digital logic (e.g., a field programmable gate array (FPGA), an erasable programmable read only memory (EPROM), an electrically erasable programmable read only memory (EEPROM)) or an ASIC that includes digital logic, software, code, electronic instructions, or any suitable combination thereof.

Network host 30 may further keep information in any suitable memory element (random access memory (RAM), read only memory (ROM), EPROM, EEPROM, ASIC, etc.), software, hardware, or in any other suitable component or device, where appropriate and based on particular needs. Any of the memory items discussed herein should be construed as being encompassed within the broad term 'memory element.' The information being tracked or sent by network host 30 and malware host 20 in network environment 10 could be provided in any database, register, table, index, control list, or storage structure, all of which can be referenced at any suitable timeframe. Any such storage options may be included within the broad term 'memory element' as used herein. Similarly, any of the potential processing components, modules, and machines described herein should be construed as being encompassed within the broad term 'processor.' Network host 30 can also include suitable interfaces and communication protocols for receiving, transmitting, and/or otherwise communicating data or information in network environment 10.

Not shown in FIG. 1 is additional hardware that may be suitably coupled to processor 34 (e.g., a single central processing unit (CPU), multiple physical CPUs, or a multi-core CPU) in the form of memory management units (MMU), additional symmetric multiprocessing (SMP) elements, peripheral component interconnect (PCI) bus and corresponding bridges, small computer system interface (SCSI)/integrated drive electronics (IDE) elements, etc. Any suitable operating systems may also be configured in network host 30 to appropriately manage the operation of hardware components therein.

In one embodiment as shown in network environment 10, malware detector 40 can be implemented on network host 30 for analyzing objects 32 to detect new variants of known malware that have been obfuscated to avoid detection by security software. Malware detectors generally may be implemented in any computing device configured to process (e.g., open, read, execute, receive, send, etc.) objects.

Filter module 42 of malware detector 40 may create one or more transformed views of an object being processed, by transforming or filtering possible obfuscation elements in the object. The elements filtered from an object may depend upon a suspected underlying obfuscation engine. For example, a file type can indicate whether an object is an email message, a web page, or a program file. Thus, appropriate filters associated with different obfuscation elements for the file type may be applied accordingly.

Correlator module 44 of malware detector 40 can analyze the transformed views, filtered information, and/or an original view of the object (i.e., a view of the object without any elements being filtered or otherwise transformed). Analyzing the views and information may include correlating, comparing, assessing, or otherwise evaluating the views and information to determine if one or more criteria related to patterns, locations, ranges, spatial distribution, spectral properties, and/or frequencies of obfuscation elements in the object are satisfied. A suspect correlation may be detected if one or more criteria are satisfied and may indicate that an obfuscated known malicious attribute is present in the object.

If one or more suspect correlations are detected and the object is identified as malware, then such information may be reported via reporting module 46 to IT administrators or other appropriate users through any suitable techniques (e.g., email message, instant message, electronic report, hard-copy report, database update, etc.). Additionally, any appropriate remedial action (e.g., quarantining, blocking, deleting, silently reporting via network, etc.) may be performed on the identified malware object such as, for example, blocking an email, blocking packets from being communicated in a network, quarantining a program file, reporting a suspect correlation detected in an object by sending an appropriate communication to an IT administrator or other authorized user, etc.).

In accordance with one embodiment of the present disclosure, malware detectors can be deployed in a computing device with an anti-virus engine and a virus definition file that contains virus signatures and possibly other information used by the anti-virus engine to detect malware, thereby preventing virus attacks. Malware detectors can be suitably integrated with or otherwise cooperate with the anti-virus engine and virus signature file. In one example implementation, malware detector 40 could be deployed with McAfee® Anti-Virus software and its associated .DAT file.

Figure 2:
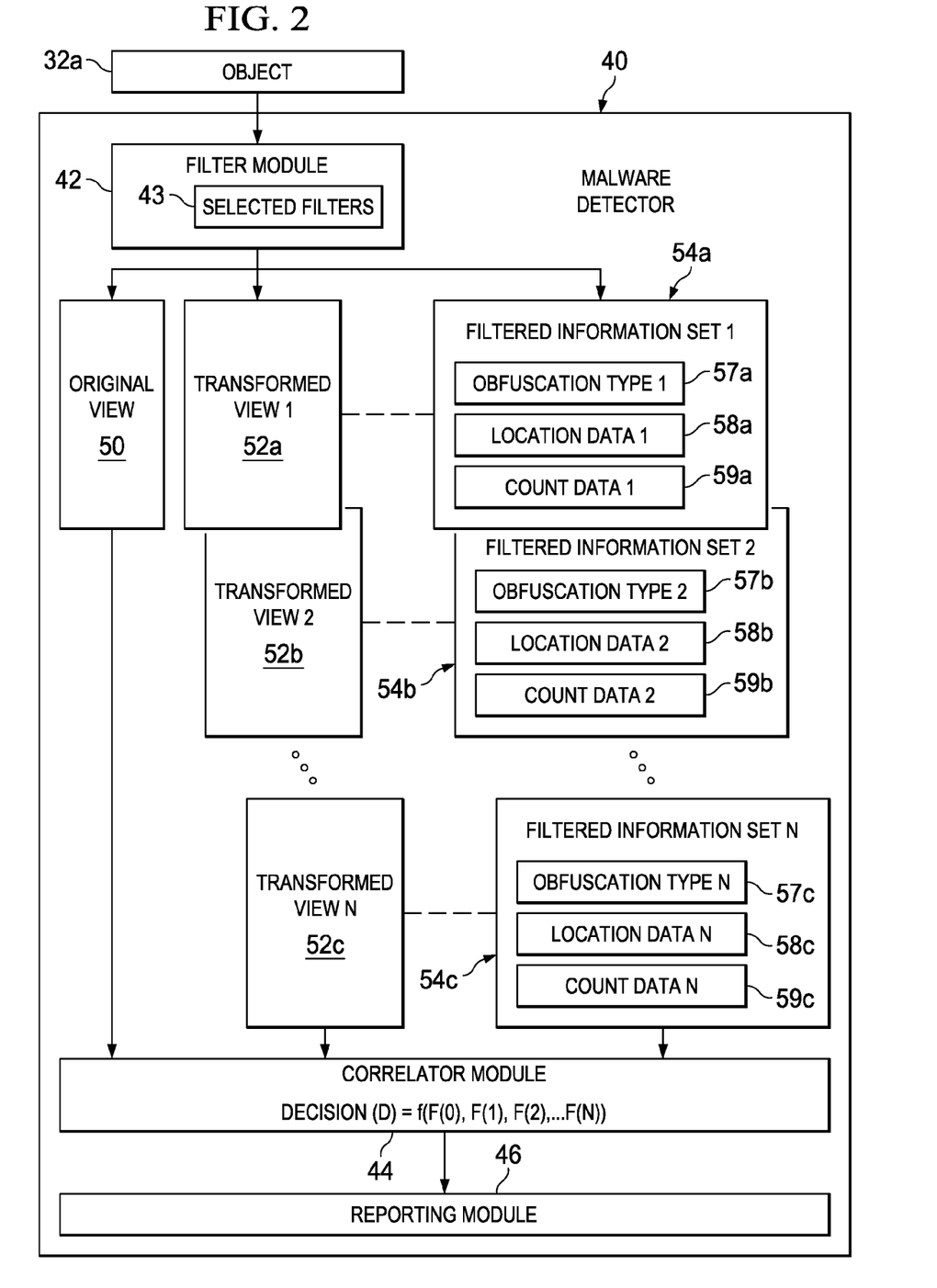
FIG. 2 is a simplified block diagram illustrating additional details that may be associated with an embodiment of the network environment in accordance with the present disclosure.

FIG. 2 shows additional details that may be associated with malware detector 40 of network environment 10. In FIG. 2, malware detector 40 may receive an object 32a to be processed, which could be one of the plurality of objects 32 on network host 30. Object 32a may be some type of data file such as an HTML web page, email message, email attachment, domain name, etc. that a process on network host 30 attempts to read, receive, send, or otherwise access. In another example, object 32a may be an executable file, script, binary program or other software module that attempts to execute or to be executed by another process on network host 30.

Filter module 42 may select a plurality of filters 43 to apply to available selected views of object 32a (i.e., original or transformed views) to generate a respective plurality of transformed views of the object. Filters 43 may be selected based upon the object type (e.g., executable file, HTML file, SPAM message, etc.) or based upon selected views of object 32a to which the filters are applied. Filters 43 may be applied to selected views of object 32a to generate transformed views (1 through N) 52a-c and respective associated filtered information sets (1 through N) 54a-c. Each of the selected filters 43 may be associated with a different obfuscation type, which may include one or more obfuscation elements. An obfuscation element is any suitable electronic data or code that can be used to obfuscate an object and that does not change the intended function of the object, where intended functions could be, for example, delivering a particular SPAM message or executing particular malicious code. Data, as used herein, refers to any type of information in a form suitable for use with a computing device and which may be communicated from one point to another in computing devices and/or networks. Code, as used herein, refers to any type of executable instructions or commands that indicate a task to be performed by a computing device.

In one embodiment, an original view 50 of object 32a may be divided into elements, which are defined segments of data or code. Obfuscations of the object may include obfuscation elements added between object elements. Other obfuscations could include obfuscation elements substituted for original object elements. After original view 50 of object 32a is divided into elements, a first filter of selected filters 43 could be applied to the original view to search for and transform obfuscation elements associated with the first filter and to create transformed view 52a. Similarly, when second and third filters of selected filters 43 are applied to an available selected view, such as the original view or an available transformed view of object 32a, obfuscation elements associated with the second and third filters may be found in the selected view and transformed to create respective transformed views 52b-c. Transforming or filtering elements may be accomplished in any suitable way, including for example, filtering out or removing obfuscation elements, replacing obfuscation elements, normalizing obfuscation elements, or otherwise suitably changing the obfuscation elements found in the selected view of the object. In addition, the entire selected view may be transformed (i.e., obfuscation elements are transformed across the entire selected view of object 32a) or only a portion or multiple portions of the selected view may be transformed (i.e., obfuscation elements are transformed in a portion or multiple portions of the selected view of object 32a).

Filtered information sets (1 through N) 54a-c are associated with transformed views (1 through N) 52a-c, respectively, and may include information related to associated transformed views 52a-c. In one embodiment, each filtered information set 54a-c includes an obfuscation type 57a-c, a location data 58a-c, and a count data 59a-c. In other embodiments, location data 58a-c may be provided such that counts of obfuscation elements could be determined from location data 58-a-c and, therefore, count data 59a-c may not be separately included. In other embodiments, distances of obfuscated elements from particular constructs in object 32a or ranges (i.e., spatial distribution and/or ranges) of obfuscation elements may also be included in filtered information sets 54a-c. Each obfuscation type (1 through N) 57a-c may include a single obfuscation element or a combination of obfuscation elements, which are transformed in the associated transformed views (1 through N) 52a-c, respectively. In one embodiment, each obfuscation type may be unique, where each obfuscation type represents a unique single obfuscation element or a unique combination of two or more obfuscation elements. In some embodiments, filtered information sets 54a-c may include only selected contextual information (e.g., location data but not count data or obfuscation type, etc.) needed for a particular analysis.

Generally, location data 58a-c and count data 59a-c indicate where and how many obfuscation elements are transformed in the associated transformed views 52a-c. For example, if a selected filter is applied to original view 50 of object 32a to generate transformed view 52a, then location data 58a may indicate each location in the original view of object 32a where one or more successive obfuscation elements of obfuscation type 57a are transformed in transformed view 52a. In this same example, for each location in location data 58a, count data 59a may include a respective sum representing an amount of one or more successively occurring obfuscation elements transformed at the corresponding location in transformed view 52a.

In another example, if another selected filter is applied to an available selected transformed view of object 32a, for example transformed view 52a, to generate transformed view 52b, then location data 58b may indicate each location in the selected transformed view 52a where one or more successive obfuscation elements of obfuscation type 57b are transformed in transformed view 52b. For each location in location data 58b, count data 59b may include a respective sum representing an amount of one or more successively occurring obfuscation elements transformed at the corresponding location in transformed view 52b.

Other information may also be included in filtered information sets 54a-c. In one example embodiment, where any transformed view is created by removing jump instructions (or their functional equivalents like PUSH+RET and others) the location data may include the size of the jump (positive or negative). Moreover, location data 58a-c, count data 59a-c, size of jump data, and other data in filtered information sets 54a-c may be stored in any suitable data structure including, for example, a table, a database, or a bit mask (or a bit field).

In order to illustrate possible embodiments of filtered information sets 54a-c, consider an object having the following original view, where the obfuscation type represents a single obfuscation element:

Original_View=data1,(address=$A$,obfuscation_type=1), (address=$A$+1,obfuscation_type=1), (address=$A$+2,obfuscation_type=1),data2

If filtered information sets 54a-c include count data, a transformed view (with obfuscation elements removed) and an associated filtered information set could be represented as follows:

Transformed_View=data1,data2

Filtered-Information=(address=*A*,obfuscation_type=1, count=3)

Locations of one or more successive occurrences of obfuscation elements (of obfuscation type=1) in the original view of the object may be represented by a reference address (e.g., address=A). The reference address could be any address enabling the representation of the location of an obfuscation element of obfuscation type=1 in the original view of the object. For example, the reference address could correspond to the first or last obfuscation element of a successive occurrence of obfuscation elements in the original view of the object.

If filtered information sets 54*a-c* do not include an explicit count data, then in one implementation, a transformed view (with obfuscation elements removed) and an associated filtered information set could be represented as follows:

Transformed_View=data1,data2

Filtered_Information=(address=*A*,obfuscation_ type=1), (address=*A*+1,obfuscation_type=1),(address=*A*+2, obfuscation_type=1)

In this embodiment, each location of an obfuscation element (of obfuscation type=1) in the object corresponds to a single occurrence of the obfuscation element in the original view of the object and is represented by an address of the particular occurrence of the obfuscation element. Accordingly, addresses in the filtered information set allow counts to be computed for any address A in the original view of the object. Filtered information could be similarly generated when filters are applied to transformed views of an object.

The number of transformed views (N) and associated filtered information sets may depend upon how many obfuscation types are possible in the particular object 32*a*. Obfuscation types may depend upon how many obfuscation elements are possible. If multiple obfuscation elements are possible, then each obfuscation element may be filtered individually. Additionally, any or all possible combinations of the obfuscation elements may be filtered from the original view and/or from any available transformed views of object 32*a* to generate different transformed views 1 through N.

Once transformed views (1 through N) 52*a-c* and filtered information sets (1 through N) 54*a-c* are generated, correlator module 44 can analyze the different views (including multiple transformed views 52*a-c* and/or original view 50 of object 32*a*) and associated filtered information sets 54*a-c* to identify or detect suspect correlations and thereby determine whether a malicious attribute is present in object 32*a*. Contextual information provided by transformed views 52*a-c* together with filtered information sets 54*a-c* allows more meaningful correlations to be made between the locations, patterns, and frequencies of obfuscation elements in the object. With N views, there could be F(N) feature sets for every view to analyze. Each feature set F(1) through F(N) can include a transformed view and an associated filtered information set. Decision D could be a result of correlating function 'f' with arguments being these feature sets: D=f(F(1), F(2), . . . F(N)).

In one embodiment, original view 50 of object 32*a*, represented by F(0), may also be analyzed with the other feature sets. In this case, correlating function 'f' could include F(0): D=f(F(0), F(1), F(2), . . . F(N)). The original view may provide a quick and efficient way to access the original malware object, for example, to compute distances between places where obfuscations occurred. This can be particularly useful when correlating relative positions (like their relative order or detecting their overlaps in the original object) of obfuscations occurring in different transformed views. Another example is when certain constructs in the original object cannot be obfuscated (if they will not work properly in obfuscated state) these constructs can be effectively used as references (their contents and/or positions) in correlations performed by function "f". Thus, in certain embodiments an original view may be analyzed with a single feature set or multiple feature sets. Additionally, in other embodiments an original view may be analyzed with a single filtered information set or multiple filtered information sets without the associated transformed views.

In certain embodiments, the function 'f' represents one or more criteria that, if satisfied, allow detection or identification of one or more suspect correlations of the feature sets. Consequently, based upon an analysis (e.g., correlation, evaluation, comparison, or assessment) of transformed views of object 32*a*, filtered information sets, and/or an original view of object 32*a*, if one or more criteria of function 'f' are satisfied, a suspect correlation may be detected and a decision can be rendered that a malicious attribute is present in object 32*a*. The criteria of function 'f' could be analyzed with respect to any or all possible combinations of the feature sets and/or the original view. Criteria could include, for example, detecting a suspicious pattern of obfuscations, detecting suspicious locations of obfuscations relative to a particular construct, detecting suspicious ranges or spatial distributions of obfuscations, exceeding a threshold of overall obfuscations, exceeding a threshold of obfuscations relative to a particular construct, or exceeding any other suitably defined threshold of suspicious obfuscations. In one example, if the count data of the relevant transformed views indicate that certain obfuscation elements occur in the associated object, even if an overall threshold amount is not exceeded, a suspect correlation may nevertheless be detected if the locations of the certain obfuscation elements indicate an attempt to hide a construct in the object (e.g., sensitive routine, etc.). A 'construct' as used herein, refers to any one or more elements in an object identified as a potential malicious attribute in an original view or transformed view of the object. For example, a construct could be a SPAM campaign message, a decryptor in polymorphic code, a malicious function or routine in an executable file, etc. As previously mentioned, some constructs may be suitable for obfuscation and some may not be.

If one or more suspect correlations are detected, then decision D may be rendered that object 32*a* contains a malicious attribute and reporting module 46 can generate one or more relevant reports, as previously described herein. The reports could contain information related to the detected suspect correlations and the malicious attribute of object 32*a*, if identified. Reporting may be invisible (e.g., internal software messaging) and can trigger further appropriate actions (e.g., remedial) or it may be visible (e.g., to the user, IT administrator or other authorized person, or any local and/or remote monitoring services).

For purposes of illustration, consider the case of object 32*a* containing polymorphic code, in which an underlying polymorphic engine has added known, do-nothing or meaningless instructions in order to obfuscate malicious functions. Generally, any instruction that can be used for obfuscation may be evaluated as a possible obfuscation instruction in an object. In one scenario, the underlying polymorphic engine may have added meaningless jump (JMP or equivalent), no operation (NOP or equivalent), and application programming interface (API) calls to hide a particular construct such as a core decryptor. Filter module 42 could create three transformed views of object 32a: 1) JMP instructions filtered, 2) NOP instructions filtered, and 3) API instructions filtered. In addition, filter module 42 could also filter out any possible combinations of the instructions to generate additional transformed views: 4) JMP and NOP instructions filtered, 5) JMP and API instructions filtered, 6) NOP and API instructions filtered and 7) JMP, NOP, and API instructions filtered.

After the transformed views are generated, the different views of object 32a can be compared and analyzed. For example, the following views, together with associated filtered information sets, may be compared: 1) original view, 2) original view and JMP filtered view, 3) original view and NOP filtered view, 4) original view and API filtered view, 5) original view, JMP filtered view, and NOP filtered view, 6) original view, NOP filtered view, and API filtered view and 7) original view, JMP filtered view, NOP filtered view, and API filtered view. By analyzing these views and associated filtered information, measuring polymorphic properties is possible without requiring emulation. Polymorphic properties may include, for example, criteria such as frequency of obfuscations, address ranges where the obfuscations are introduced, and locations in relation to the unobfuscated decryptor. The frequency of obfuscations can be any meaningful number related to obfuscation elements in an object and may represent or be derived from count data 59a-c. For example, meaningful numbers could include a total number of obfuscation elements in an object (e.g., total number of JMP instructions filtered), a number of successive occurrences of one or more obfuscation elements in an object, a number obfuscation elements (or successive occurrences of obfuscation elements) in a portion or multiple portions of an object, etc. The ranges where the obfuscations are introduced can be the spatial distribution of the obfuscations (e.g., a longer range can mean the obfuscations are more distributed).

Measuring polymorphic properties can be used as part of detecting suspect correlations or, in some cases, detecting on these properties alone. The obfuscations can be related to the context where they appear as well as to the other obfuscations. In addition, transforming an object and analyzing views of the object allow meaningful separation of useful elements (e.g., decryptor) and unnecessary elements (e.g., do-nothing or meaningless instructions). Thus, decisions can be made with a maximum of available information, thereby reducing errors and false positives.

In another illustrative case, object 32a could contain a SPAM message (e.g., in a SPAM email), in which an underlying text generator added pseudo-random generated phrases or words to the message. In one scenario, the vocabulary of the phrase or text generator (e.g., offer, sale, special, deal) may be obfuscation elements that can be filtered from object 32a individually and/or in different combinations to create different transformed views of the object in order to identify an underlying SPAM campaign message (or construct) such as 'Buy meds from pharmacy.dodgydomain.com', for example. Filtered information sets 54a-c may include location and frequency data of the vocabulary words. By analyzing these transformed views 52a-c together with associated filtered information sets 54a-c, and possibly original view 50 of object 32a, suspect correlations may be detected such that a SPAM campaign message (e.g., 'Buy meds from pharmacy.dodgydomain.com') may be identified and, additionally, the text generator used to obfuscate the SPAM message may be identifiable. Accordingly, a generic SPAM detection tool can be created for SPAM messages that are obfuscated using the identified text generator.

Numerous other embodiments for detecting suspect correlations of various obfuscated objects can be configured in accordance with the present disclosure. Other example embodiments could include 1) transforming white spaces in email messages in a separate view instead of a more traditional method of removing and/or compressing the white spaces (which may be particularly suitable for detecting SPAM messages), 2) transforming comments in scripts or transforming any redundant code/data, 3) transforming 'funny' characters that have a similar or identical appearance, for example in Internet domain names (e.g., 'gØØgle.com' instead of 'google.com'), 4) converting characters to a different alphabet/codepage, and 5) removing from images or video files any visual noise such as dots, spots, extra frames or any other data capable of obfuscating images or video files (e.g., GIF, JPEG, BMP, PNG, AVI, MKV, MP4, etc.) and 6) removing audio noise and/or pauses from audio files (MP3, WAV, OGG, etc.).

The system and method of transforming an obfuscated object and analyzing different views of the object enables better recognition of malicious attributes of the object by allowing contextual correlation of features found in the different views of the object. By stripping out the obfuscations, these different views can be generated and analyzed. Thus, the identification of malicious attributes may be achieved through partial or full reversal of the obfuscation and determining a pattern significant to an original method of transformation of the object. In addition, false positive rates may be reduced during this recognition due to an ability to discard certain features identified as falling within a less suspicious context than other features. Finally, the system and method may be applied to all types of malicious objects, for example, binary programs, HTMLs, scripts, texts, domain names and the like, where any kind of obfuscation has occurred, including multi-level obfuscation.

Figure 3:
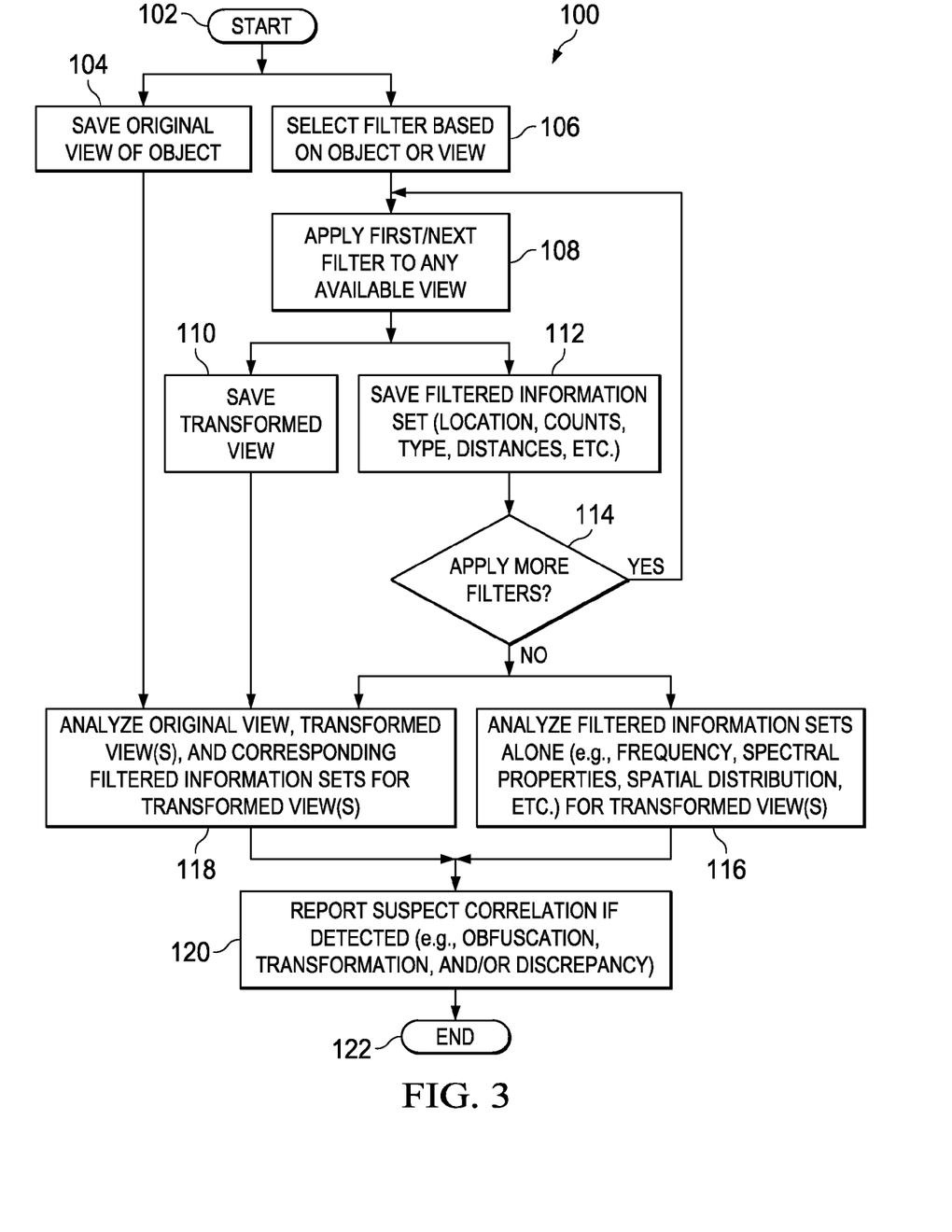
FIG. 3 is a simplified flowchart illustrating a series of example operational steps that may be associated with transforming and analyzing objects in a potential embodiment of the network environment in accordance with the present disclosure.

Turning to FIG. 3, FIG. 3 is a simplified flow 100 illustrating example operational steps that may be associated with transforming and analyzing views of an object in network environment 10. Flow 100 may start at 102. An original view of an object (e.g., object 32a) may be saved or stored at 104 in any suitable memory (e.g., memory element 36) for further analysis with transformed views of object 32a. At 106, a filter may first be selected based on the type of object being processed. For example, if the object type indicates that object 32a includes polymorphic code, then an appropriate first filter for polymorphic code may be selected. The first filter could include, for example, a single obfuscation element such as a JMP instruction. The selected first filter with the obfuscation element may be applied to an original view of object 32a at 108.

After the selected first filter is applied, a transformed view (e.g., transformed view 52a) of object 32a may be saved or stored at 110 in any suitable memory (e.g., memory element 36). The type of filtering applied to create a transformed view could be based on particular needs and/or implementations. For example, the JMP instruction could be removed, replaced, normalized, or otherwise suitably altered to create transformed view 52a. The filter also may apply some logic in deciding which JMP instructions need to be filtered out from view 52a depending on the context, filtering history and/or the type of the object.

Filtered information set 54a, which is associated with transformed view 52a, may be saved or stored in any suitable memory at 112 (e.g., memory element 36). In one embodiment, obfuscation type 57a, location data 58a, and count data 59a may be included in filtered information set 54a. Obfuscation type 57a could indicate the obfuscation element or elements (e.g., JMP instruction) filtered from original view 50 of object 32a. Location data 58a could indicate where in transformed view 52a the obfuscation elements were transformed. Count data 59a could include counts of successive occurrences in the object of the obfuscation elements being filtered.

In one illustrative example, assume the selected filter removes the associated obfuscation element (e.g., JMP instruction) from an original view of object 32a to generate a transformed view. If three JMP instructions occur successively prior to a decryptor code element in object 32a, and two JMP instructions occur successively following the decryptor code element in object 32a and prior to a second element in object 32a, then the location data could indicate obfuscation elements were removed prior to the decryptor code element and prior to the second element. Count data could indicate that three obfuscation elements were removed prior to the decryptor code element and two obfuscation elements were removed prior to the second element. Additionally, any other appropriate information may also be included in filtered information set 54a, for example, distances of obfuscation elements from particular constructs, such as the decryptor code element identified in transformed view 52a.

After filtered information set 54a has been saved at 112, a decision may be made at 114 as to whether any more filters could be applied to the original view of the particular object 32a being processed or to any transformed view that has been generated. If more filters could be applied, then flow may loop back to 108 to apply the next filter to any available view (e.g., original view of object 32a or transformed view 52a) and, hence, create the next transformed view 52b and associated filtered information set 54b. In the example polymorphic code object, after the JMP instruction has been filtered, then it may be determined at 114 that NOP instructions could be filtered from an available view of object 32a. Accordingly, either original view 50 or transformed view 52a of object 32a may be selected and NOP instructions can be filtered from the selected view at 108. Flow may continue, recursively, to create additional transformed views and associated filtered information sets until all possible or desired filters have been applied to selected view(s).

If a determination is made at 114 that no more filters are to be applied to any available views, then filtered information sets 54a-c may be analyzed alone at 116. The analysis of filtered information sets could include an analysis of frequency, spectral properties, spatial distribution, etc. Depending on the type of obfuscation contained in object 32a, this analysis could result in a decision that obfuscation was used to hide a malicious attribute in object 32a. In one example, a known obfuscation technique using a particular pattern and/or type of obfuscation elements may be detected by analyzing filtered information sets alone at 116.

In many cases, however, new variants of known malware cannot be accurately detected simply by analyzing filtered information alone. Therefore, any suitable combination of the original view of the object, transformed views of the object, and/or associated filtered information sets may be analyzed together at 118 to detect suspect correlations that may indicate the object contains a malicious attribute. The analyzing could include rendering a decision D, as previously described herein, as a result of a correlating function 'f' with arguments being feature sets including the transformed views together with associated filtered information sets. The arguments could also include the original view of the object. Example criteria that may be used in the correlating function 'f', and which may be analyzed for any or all combinations of the feature sets, can include detecting suspicious patterns of obfuscations, exceeding thresholds of obfuscations, and determining locations and/or frequencies of obfuscations relative to particular constructs. If one or more suspect correlations are detected in 118 and/or 116, then decision D may be rendered that the object contains a malicious attribute. Information relevant to the decision D, such as the suspect correlations, may be reported at 120 as previously described herein. In addition, appropriate remediation activities (e.g., blocking, quarantining, allowing with notice to authorized user, network-only reporting, etc.) may be performed. Flow ends at 122 when analysis and reporting functions have been completed for the object.

Software for achieving the operations outlined herein can be provided at various locations (e.g., the corporate IT headquarters, end user computers, network elements and in a network such as a LAN, distributed servers in the cloud, gateways, scanners, mobile and portable devices, etc.). In some embodiments, this software could be received or downloaded from a web server (e.g., in the context of purchasing individual end-user licenses for separate networks, devices, servers, etc.) in order to provide a system for detecting malware by transforming an object and analyzing different views of the object. In one example implementation, this software is resident in one or more computers or network elements sought to be protected from a security attack (or protected from unwanted or unauthorized manipulations of data).

In example embodiments, the software for detecting malware by transforming objects and analyzing different views of objects could involve a proprietary element (e.g., as part of a network security solution with McAfee® EPO software, McAfee® AntiVirus software, etc.), which could be provided in (or be proximate to) the identified components, or be provided in any other device, server, network appliance, console, firewall, switch, information technology (IT) device, distributed server, etc., or be provided as a complementary solution (e.g., in conjunction with a firewall), or provisioned somewhere in the network.

In certain example implementations, the transforming and analyzing activities outlined herein may be implemented in software provided in malware detector 40 in network host 30 and in other network elements and computers. These components and modules are shown as examples of software to perform transforming and analyzing activities. In certain embodiments, malware detector 40 in network host 30 (and possibly malware detectors in other network elements and computers) may cooperate with other security solutions in order to perform transforming and analyzing activities as discussed herein. In some embodiments, these features may be provided external to these components, included in other devices to achieve these intended functionalities, or consolidated in any appropriate manner. For example, some of the processors associated with the various components may be removed, or otherwise consolidated such that a single processor and a single memory location are responsible for certain activities. In a general sense, the arrangement depicted in FIG. 1 may be more logical in its representation, whereas a physical architecture may include various permutations/combinations/hybrids of these elements.

In various embodiments, these components (e.g., network host 30) include software (or reciprocating software) that can coordinate, manage, or otherwise cooperate in order to achieve the transforming and analyzing operations, as outlined herein. One or more of these components may include any suitable algorithms, hardware, software, modules, interfaces, or objects that facilitate the operations thereof. In the implementation involving software, such a configuration may be inclusive of logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.), which may be inclusive of non-transitory media. In some of these instances, one or more memory elements (as shown in FIG. 1) can store data used for the operations described herein. This includes the memory element being able to store software, logic, code, or processor instructions that are executed to carry out the activities described in this Specification.

Note that with the examples provided herein, interaction may be described in terms of two, three, four, or more network components. However, this has been done for purposes of clarity and example only. It should be appreciated that the system can be consolidated in any suitable manner. Along similar design alternatives, any of the illustrated computers, modules, and components of the FIGS. 1-3 may be combined in various possible configurations, all of which are clearly within the broad scope of this Specification. In certain cases, it may be easier to describe one or more of the functionalities of a given set of flows by only referencing a limited number of components or network elements. Therefore, it should also be appreciated that the system of FIG. 1 (and its teachings) is readily scalable. The system can accommodate a large number of components, as well as more complicated or sophisticated arrangements and configurations. Accordingly, the examples provided should not limit the scope or inhibit the broad teachings of the system as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method, comprising:
generating a plurality of transformed views of an object in a network environment;
generating a plurality of filtered information sets corresponding respectively to the plurality of transformed views, each of the filtered information sets including particular location data indicating one or more locations in the object corresponding to at least one obfuscation element, wherein a first filtered information set of the plurality of filtered information sets includes a first location data indicating one or more locations in the object corresponding to a first obfuscation element, and wherein a second filtered information set of the plurality of filtered information sets includes a second location data indicating one or more locations in the object corresponding to a second obfuscation element; and
detecting a suspect correlation based on an analysis of at least some of the plurality of transformed views and of at least some of the plurality of filtered information sets, wherein the analysis includes:
identifying a construct in first and second transformed views; and
determining whether one or more criteria are satisfied based on a proximity of the one or more locations of the first location data and the one or more locations of the second location data relative to the construct in the first and second transformed views, respectively.

2. The method of claim 1,
wherein the generating the plurality of transformed views includes applying a plurality of filters to one or more selected views of the object, and
wherein each of the plurality of filters is associated with a different obfuscation type.

3. The method of claim 1, further comprising reporting the suspect correlation.

4. One or more non-transitory computer readable storage media that includes code for execution and when executed by at least one processor is operable to perform operations comprising:
generating a plurality of transformed views of an object in a network environment;
generating a plurality of filtered information sets corresponding respectively to the plurality of transformed views, each of the filtered information sets including particular location data indicating one or more locations in the object corresponding to at least one obfuscation element, wherein a first filtered information set of the plurality of filtered information sets includes a first location data indicating one or more locations in the object corresponding to a first obfuscation element, and wherein a second filtered information set of the plurality of filtered information sets includes a second location data indicating one or more locations in the object corresponding to a second obfuscation element; and
detecting a suspect correlation based on an analysis of at least some of the plurality of transformed views and of at least some of the plurality of filtered information sets, wherein the analysis includes:
identifying a construct in first and second transformed views of the plurality of transformed views; and
determining whether one or more criteria are satisfied based on first and second location data relative to the construct in the first and second transformed views, respectively.

5. The one or more computer readable storage media of claim 4,
wherein the generating the plurality of transformed views includes applying a plurality of filters to one or more selected views of the object to generate the plurality of transformed views and
wherein each of the plurality of filters is associated with a different obfuscation type.

6. The one or more non-transitory computer readable storage media of claim 5,
wherein the applying the plurality of filters includes transforming one or more obfuscation elements in the plurality of transformed views, and
wherein the object contains the one or more obfuscation elements.

7. The one or more computer readable storage media of claim 4, wherein the analysis includes an original view of the object.

8. The one or more non-transitory computer readable storage media of claim 4,
    wherein the generating the plurality of transformed views includes:
        applying a selected first filter to an original view of the object to generate a first transformed view of the plurality of transformed views; and
        applying a selected second filter to the first transformed view to generate a second transformed view of the plurality of transformed views, and
    wherein each of the plurality of filters is associated with a different obfuscation type.

9. An apparatus, comprising:
    a malware detection module;
    an object; and
    at least one processor operable to execute operations associated with the object, wherein the malware detection module, the object, and the processor cooperate such that the apparatus is configured for:
        generating a plurality of transformed views of an object in a network environment;
        generating a plurality of filtered information sets corresponding respectively to the plurality of transformed views, each of the filtered information sets including particular location data indicating one or more locations in the object corresponding to at least one obfuscation element, wherein a first filtered information set of the plurality of filtered information sets includes a first location data indicating one or more locations in the object corresponding to a first obfuscation element, and wherein a second filtered information set of the plurality of filtered information sets includes a second location data indicating one or more locations in the object corresponding to a second obfuscation element; and
        detecting a suspect correlation based on an analysis of at least some of the plurality of transformed views and of at least some of the plurality of filtered information sets, wherein the analysis includes determining whether one or more criteria are satisfied based on a first frequency of the first filtered obfuscation element and a second frequency of the second filtered obfuscation element.

10. The apparatus of claim 9,
    wherein the generating the plurality of transformed views includes applying a plurality of filters to one or more selected views of the object, and
    wherein each of the plurality of filters is associated with a different obfuscation type.

11. The apparatus of claim 10,
    wherein the applying the plurality of filters includes transforming one or more obfuscation elements in the plurality of transformed views, and
    wherein the object contains the one or more obfuscation elements.

12. The apparatus of claim 11, wherein the transforming one or more obfuscation elements includes one of removing, replacing, or normalizing the one or more obfuscation elements in the plurality of transformed views.

13. The apparatus of claim 11, wherein the one or more obfuscation elements are selected from a group consisting of polymorphic code instructions, vocabulary text from a text generator, and noise.

14. One or more non-transitory computer readable storage media that includes code for execution and when executed by at least one processor is operable to perform operations comprising:
    generating a plurality of transformed views of an object in a network environment;
    generating a plurality of filtered information sets corresponding respectively to the plurality of transformed views, each of the filtered information sets including particular location data indicating one or more locations in the object corresponding to at least one obfuscation element, wherein a first filtered information set of the plurality of filtered information sets includes a first location data indicating one or more locations in the object corresponding to a first obfuscation element, wherein one or more occurrences of the first obfuscation element in the object are transformed in the first transformed view, wherein a second filtered information set of the plurality of filtered information sets includes a second location data indicating one or more locations in the object corresponding to a second obfuscation element, and wherein one or more occurrences of the second obfuscation element in the object are transformed in the second transformed view; and
    detecting a suspect correlation based on an analysis of at least some of the plurality of transformed views and of at least some of the plurality of filtered information sets.

15. The one or more non-transitory computer readable storage media of claim 14,
    wherein the generating the plurality of transformed views includes applying a plurality of filters to one or more selected views of the object, and
    wherein each of the plurality of filters is associated with a different obfuscation type.

16. The one or more non-transitory computer readable storage media of claim 15,
    wherein the applying the plurality of filters includes transforming one or more obfuscation elements in the plurality of transformed views, and
    wherein the object contains the one or more obfuscation elements.

17. The one or more non-transitory computer readable storage media of claim 16, wherein the transforming one or more obfuscation elements includes one of removing, replacing, or normalizing the one or more obfuscation elements in the plurality of transformed views.

18. The one or more non-transitory computer readable storage media of claim 16, wherein the one or more obfuscation elements are selected from a group consisting of polymorphic code instructions, vocabulary text from a text generator, and noise.

19. One or more non-transitory computer readable storage media that includes code for execution and when executed by at least one processor is operable to perform operations comprising:
    generating a plurality of transformed views of an object in a network environment;
    generating a plurality of filtered information sets corresponding respectively to the plurality of transformed views, each of the filtered information sets including particular location data indicating one or more locations in the object corresponding to at least one obfuscation element, wherein a first filtered information set of the plurality of filtered information sets includes a first location data indicating one or more locations in the object corresponding to a first obfuscation element, wherein each of the one or more locations of the first location data corresponds to a single occurrence of the first obfuscation element in the object, wherein a second filtered information set of the plurality of filtered information sets includes a second location data indicating one or more locations in the object corresponding to a second obfuscation element, and wherein each of the one or more locations of the second location data corresponds to a single occurrence of the second obfuscation element in the object; and detecting a suspect correlation based on an analysis of at least some of the plurality of transformed views and of at least some of the plurality of filtered information sets.

20. The one or more non-transitory computer readable storage media of claim 19, wherein the analysis is based, in part, on an original view of the object.

21. The one or more non-transitory computer readable storage media of claim 19, wherein the generating the plurality of transformed views includes applying a plurality of filters to one or more selected views of the object, and wherein each of the plurality of filters is associated with a different obfuscation type.

22. The one or more non-transitory computer readable storage media of claim 21, wherein the applying the plurality of filters includes transforming one or more obfuscation elements in the plurality of transformed views, and wherein the object contains the one or more obfuscation elements.

23. The one or more non-transitory computer readable storage media of claim 19, wherein the generating the plurality of transformed views includes:

applying a selected first filter to an original view of the object to generate a first transformed view of the plurality of transformed views; and applying a selected second filter to the first transformed view to generate a second transformed view of the plurality of transformed views, wherein each of the plurality of filters is associated with a different obfuscation type.

24. One or more non-transitory computer readable storage media that includes code for execution and when executed by at least one processor is operable to perform operations comprising:

generating a plurality of transformed views of an object in a network environment;

generating a plurality of filtered information sets corresponding respectively to the plurality of transformed views, each of the filtered information sets including particular location data indicating one or more locations in the object corresponding to at least one obfuscation element, wherein a first filtered information set of the plurality of filtered information sets includes a first location data indicating one or more locations in the object corresponding to a first obfuscation element, wherein each of the one or more locations of the first location data corresponds to one or more successive occurrences of the first obfuscation element in the object, wherein a second filtered information set of the plurality of filtered information sets includes a second location data indicating one or more locations in the object corresponding to a second obfuscation element, and wherein each of the one or more locations of the second location data corresponds to one or more successive occurrences of the second obfuscation element in the object; and detecting a suspect correlation based on an analysis of at least some of the plurality of transformed views and of at least some of the plurality of filtered information sets.

25. The one or more non-transitory computer readable storage media of claim 24, wherein the generating the plurality of transformed views includes applying a plurality of filters to one or more selected views of the object, and wherein each of the plurality of filters is associated with a different obfuscation type.

26. The one or more non-transitory computer readable storage media of claim 25, wherein the applying the plurality of filters includes transforming one or more obfuscation elements in the plurality of transformed views, and wherein the object contains the one or more obfuscation elements.

27. The one or more non-transitory computer readable storage media of claim 26, wherein the transforming one or more obfuscation elements includes one of removing, replacing, or normalizing the one or more obfuscation elements in the plurality of transformed views.

28. The one or more non-transitory computer readable storage media of claim 26, wherein the one or more obfuscation elements are selected from a group consisting of polymorphic code instructions, vocabulary text from a text generator, and noise.

* * * * *